United States Patent [19]

Li

[11] Patent Number: 5,673,266

[45] Date of Patent: *Sep. 30, 1997

[54] SUBSEQUENT FRAME VARIABLE DATA RATE INDICATION METHOD

[75] Inventor: Kaiping Li, Lawrenceville, Ga.

[73] Assignee: Oki Telecom, Suwanee, Ga.

[*] Notice: The term of this patent shall not extend beyond the expiration date of Pat. No. 5,537,410.

[21] Appl. No.: 465,881

[22] Filed: Jun. 6, 1995

Related U.S. Application Data

[63] Continuation of Ser. No. 306,777, Sep. 15, 1994, Pat. No. 5,537,410.

[51] Int. Cl.$^6$ ............................................. H04T 3/22
[52] U.S. Cl. ................. 370/465; 370/395; 370/479; 375/222; 371/55
[58] Field of Search ........................ 370/84, 81, 82, 370/95.1, 95.3, 18, 310, 342, 395, 464, 465, 479, 351, 389; 375/205, 219, 220, 222; 371/5.5, 2.1; 455/33.1, 54.1, 56.1; 348/399; 395/2.2, 2.3; 381/30, 29

[56] References Cited

U.S. PATENT DOCUMENTS

| 4,779,266 | 10/1988 | Chung et al. | 370/93 |
| 4,860,315 | 8/1989 | Hosoda et al. | 375/30 |
| 5,115,429 | 5/1992 | Hluchyj et al. | 370/84 |
| 5,259,003 | 11/1993 | Berger et al. | 375/38 |
| 5,341,456 | 8/1994 | DeJaco | 395/2.23 |
| 5,367,523 | 11/1994 | Chang et al. | 370/84 |
| 5,414,796 | 5/1995 | Jacobs et al. | 395/2.3 |
| 5,442,625 | 8/1995 | Gitlin et al. | 370/18 |

FOREIGN PATENT DOCUMENTS

| 8601357 | 2/1986 | European Pat. Off. | 370/84 |

OTHER PUBLICATIONS

"Mobile Station–Base Station Compatability Standard For Dual–Mode Wideband Spread Spectrum Cellular System TIA/EIA/1S–95 Interim Standard" –Sections 6–6.2.4 and 7–7.2.4 –1S–95.

"Speech Service Option Standard for Wideband Spread Spectrum Digital Cellular System TIA/EIA/1S–96 Interim Standard" –Entire 1S–96.

*Primary Examiner*—Alpus H. Hsu
*Assistant Examiner*—Seema S. Rao
*Attorney, Agent, or Firm*—Jeffrey R. Kuester; Thomas, Kayden, Horstemeyer & Risley, L.L.P.

[57] ABSTRACT

In a synchronous fixed frame boundary system with variable data rates, a transmitter inserts into a current frame an indication of the data rate of the next frame. After the first frame is received and processed at a receiver, the data rates of subsequent frames are known before processing, thereby reducing processing load. Furthermore, because the rate indication is inserted into the frame to be error protected along with the rest of the frame information, reliability is high, while additional data overhead and complexity are very low. As an example, North American code division multiple access digital cellular telephone systems utilize variable data rate transmissions. As a station modem (SM) assembles a current frame for convolutional encoding and further processing, the SM inserts a rate indication for the subsequent frame in accordance with information from a vocoder and CPU of the appropriate data rate for the subsequent frame. On the receiving end, rather than needing to decode multiple times to determine the appropriate data rate for every frame, the receiving SM discovers the rate of each frame subsequent to the first frame by analyzing the information contained in the immediately preceding frame. The rate determination process also includes a verification method based upon a frame quality indicator analysis and a symbol error rate analysis to ensure accurate data rate determination.

57 Claims, 6 Drawing Sheets

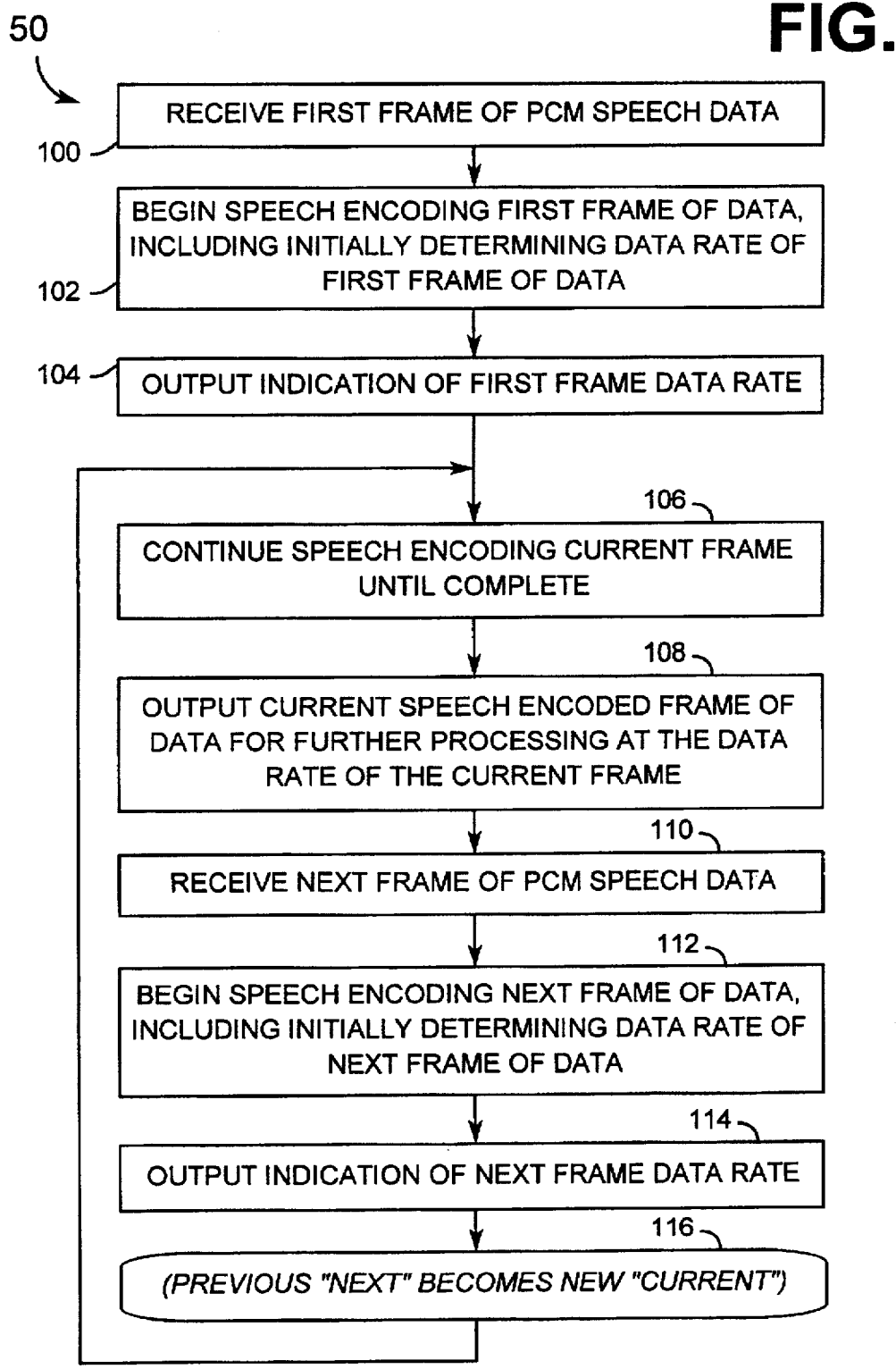

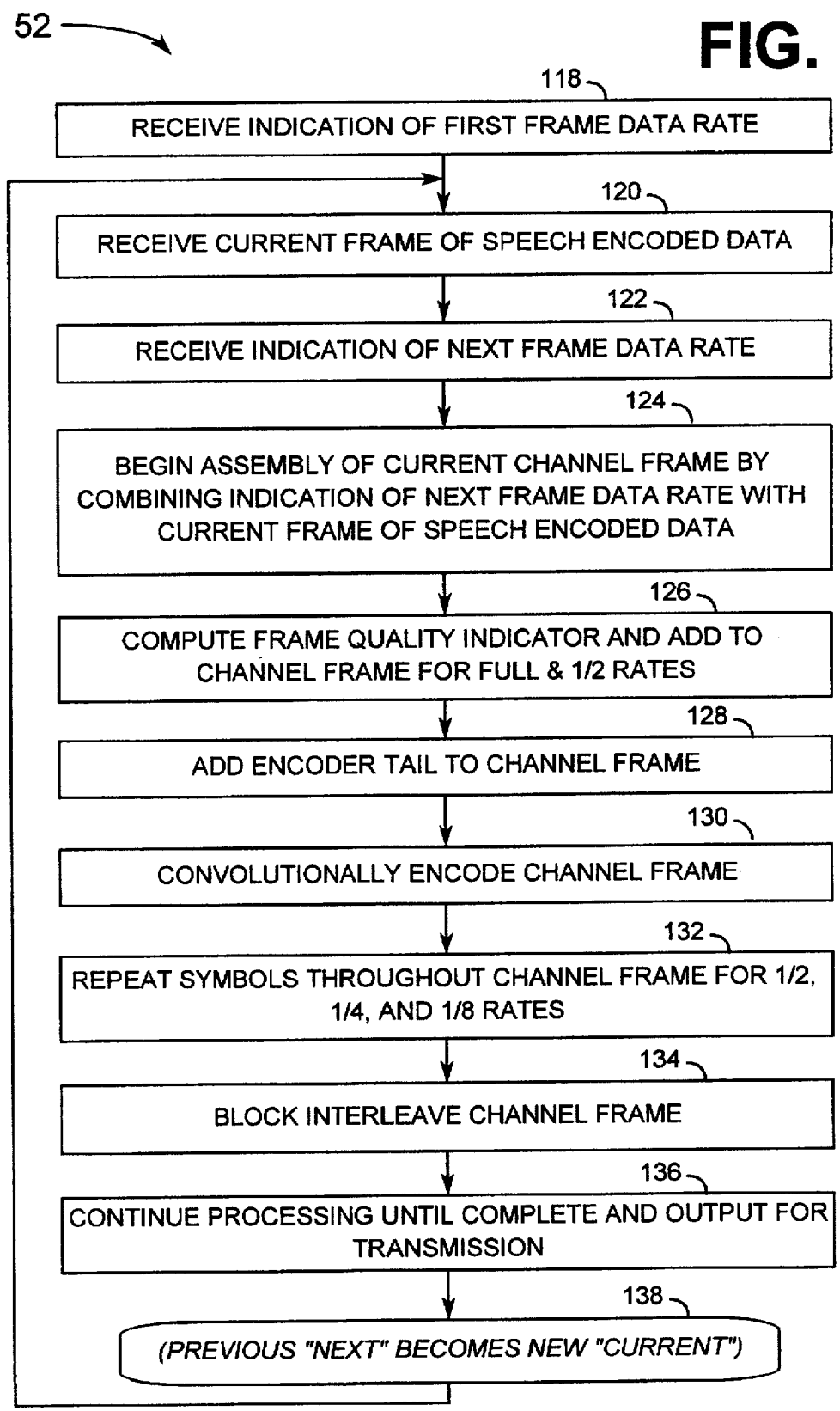

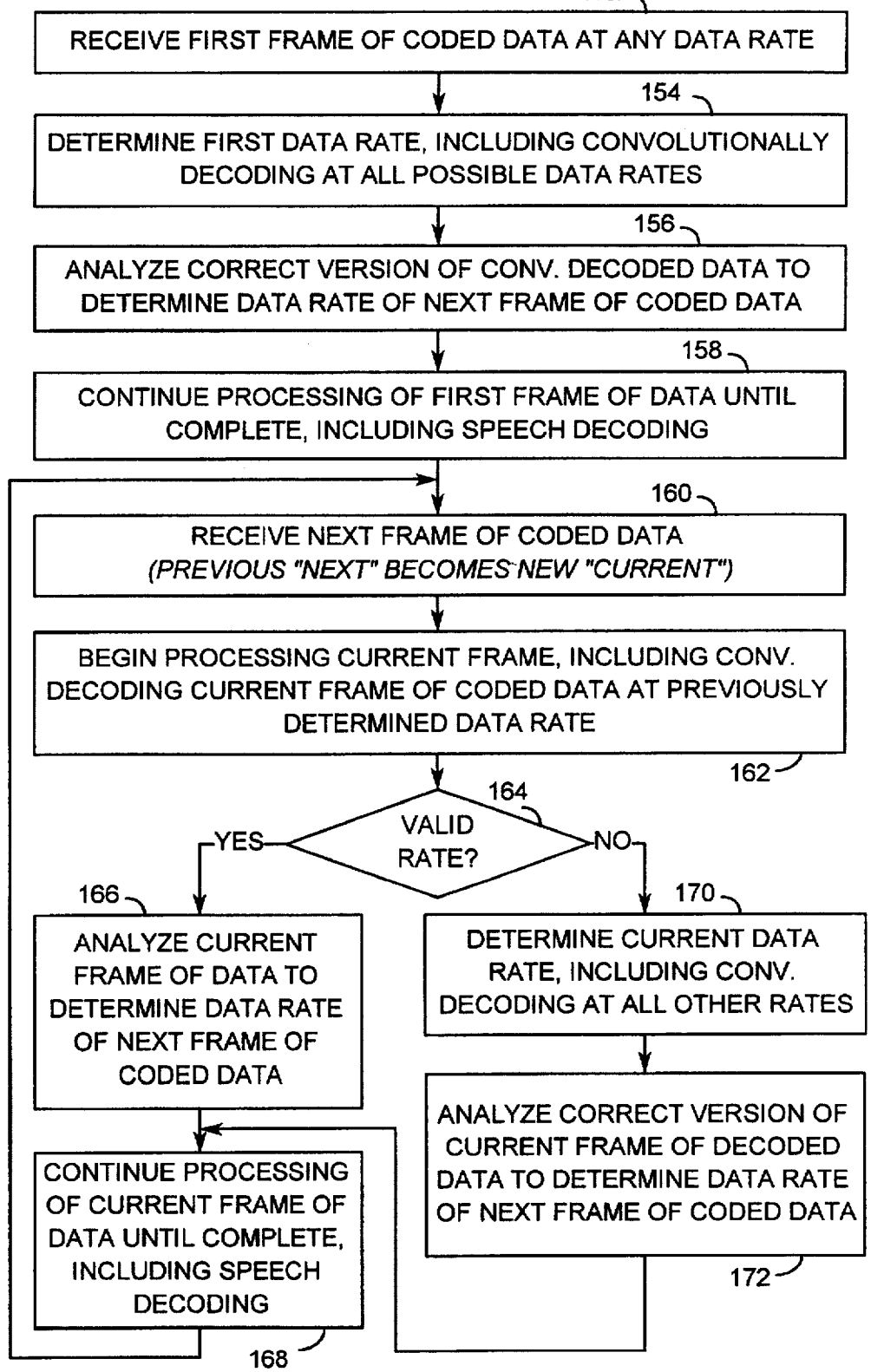

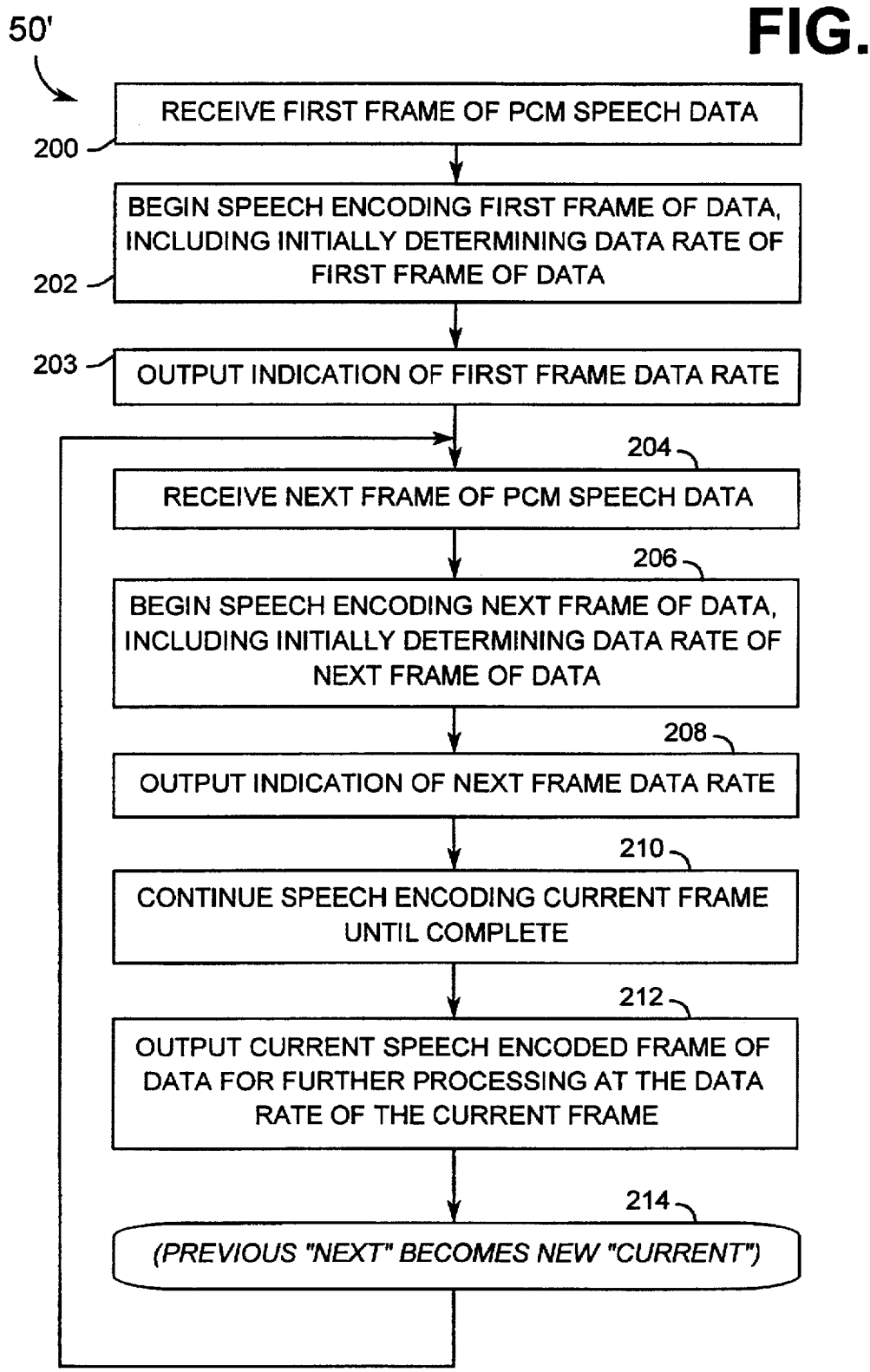

SUBSEQUENT FRAME VARIABLE DATA RATE INDICATION METHOD

This is a Continuation of application Ser. No. 08/306,777 filed Sep. 15, 1994, now U.S. Pat. No. 5,537,410.

BACKGROUND OF THE INVENTION

The present invention relates generally to the field of data communications, and more specifically, to the field of synchronous, fixed boundary, variable data rate communication systems, such as code division multiple access (CDMA) North American digital cellular telephone systems.

Synchronous communication systems which utilize fixed frame boundary data frames including data at variable rates are known in the art. One example is the CDMA North American digital cellular system, a well-known class of modulation using specialized codes to provide multiple communication channels in a designated segment of the electromagnetic spectrum. The Telecommunications Industry Association (TIA) has standardized a CDMA implementation in the "Mobile Station-Base Station Compatibility Standard for Dual-Mode Wideband Spread Spectrum Cellular System TIA/EIA/IS-95 Interim Standard" (IS-95) and the "Speech Service Option Standard for Wideband Spread Spectrum Digital Cellular System TIA/EIA/IS-96 interim Standard" (IS-96). Sections 6–6.2.4 and 7–7.2.4 of IS-95 and the entire IS-96 are hereby incorporated by reference.

In the conventional CDMA digital cellular system, as disclosed in the current IS-95 and IS-96, variable data rates are utilized by reducing the data transmission rate during times of reduced speech activity. This data rate reduction results both in a reduction of interference with other users (thereby increasing capacity in the system) as well as in a reduction in average transmit power of the CDMA mobile station (thereby increasing battery life). On the transmitter end (transmitting base station or transmitting mobile station), a vocoder (voice or speech encoder/decoder) compares voice energy levels to adaptive thresholds based on background noise levels to determine an appropriate data rate for each frame of speech data, thereby suppressing background noise and providing good voice transmission in noisy environments. Using a code excited linear prediction (CELP) method, the vocoder receives pulse code modulated speech samples and reduces the number of bits required to represent speech by exploiting the intrinsic properties of speech signals to remove redundancy. Subsequently, the speech encoded data is convolutionally encoded for forward error correction before being interleaved and modulated for transmission.

Since the data rate may change at each frame boundary, the CDMA receiver must first determine the data rate of each frame of data. The process by which this is accomplished in the conventional CDMA digital cellular system is a source of wasted time and processing energy. According to the current CDMA digital cellular system, each data frame must be separately processed at each of the various possible data rates (including convolutional decoding) before a decision is made regarding which data rate was utilized on the transmitter end. Since this method is clearly inefficient, there is a need in the industry for a new method for determining the data rate of each frame of data in the CDMA digital cellular system, as well as other systems using fixed boundary flames with variable data rates.

One possible method of addressing this problem is the addition of a conventional header before each frame of data. Such a header could include the data rate of the corresponding frame to which it is attached. Unfortunately, such a header would also need error protection to reduce the likelihood of transmission errors. In view of the relatively small size of each frame of data, the additional bits required for an error protected header would certainly add substantial overhead and undesirable complexity to the system.

There is, therefore, a need in the industry for a system which addresses these and other related, and unrelated, problems.

SUMMARY OF THE INVENTION

Briefly described, the present invention includes a subsequent (or "next") frame variable data rate indication method whereby a transmitter inserts into the frame structure of a current frame an indication of the data rate of the next frame. According to the preferred embodiment of the present invention, after the first frame is received and conventionally processed at a receiver, the data rates of subsequent frames are known before processing, thereby reducing processing load. Furthermore, because the rate indication is inserted into the current frame to be error protected along with the rest of the frame information, reliability is high, while additional data overhead and complexity are very low.

In its most preferred embodiment, as applied to one implementation of a CDMA digital cellular telephone system, as a transmitting station modem (SM) (located in either the mobile station or the base station) assembles a current traffic channel frame for convolutional encoding, the transmitting SM inserts an indication of the data rate of the subsequent channel frame of data. In many cases, (e.g. primary traffic frames) a vocoder speech encodes PCM data for the SM and notifies the transmitting SM through a central processing unit (CPU) of the appropriate data rate for the subsequent frame, and in other cases, the CPU issues commands to the SM and the vocoder to influence the selection of the data rate.

The number of bits necessary to provide a one-to-one representation of the various rates equals the smallest integer greater or equal to the $\text{Log}_2$ of the total number of possible rates, e.g., since the current CDMA system utilizes four possible data rates, two bits are adequate to provide a one-to-one indication of each of the possible data rates, whereas three bit would be required to similarly represent five to eight possible rates, etc. in the conventional CDMA IS-95 frame structure, the two indication bits are, for example, easily substituted for two frame quality indication bits for the top two rates and for two information bits for the lower two rates. Since the rate indication is embedded in the structure of the frame itself, the rate indication bits receive the same error protection (error correction and error detection) as the other information in the data frame. Consequently, the current inventive method exhibits high reliability without the need for great complexity or expense.

On the receiving end, rather than needing to process each frame of data multiple times at each of the possible data rates, including convolutional decoding, to determine the appropriate data rate for each frame of data, the receiving SM discovers the data rate of each frame of data subsequent to the first frame of data by analyzing the information contained in the immediately preceding frame of data. In other words, after the very first frame is, in the conventional manner, processed at each of the various rates to determine the appropriate data rate for the first frame, the receiving SM is able to determine the data rate of the second frame of data before needing to process the second frame of data. This process continues so that the data rates of each of the subsequent data frames are determined in the frames preceding each of the subsequent frames.

Additionally, according to the preferred embodiment of the present invention, in an effort to prevent transmission errors from propagating through the series of data frames, the rate selection process is continually examined, such as through monitoring frame quality indicators and symbol error rates. If FQI (frame quality indication) checking fails and/or if the symbol error rate is too high for any particular frame, the method further includes conventionally processing the frame at each of the remaining multiple rates to ensure accurate data rate determination for that particular frame, after which rate determinations proceed according to the new method. If the rate still cannot be determined after being processed at the various possible data rates, the frame is classified as an erasure frame, and the process continues by processing the next frame as the first frame was processed. As should be evident, the processing load on the receiving SM is greatly reduced by not needing to process each frame at each of the various rates. Thus, for the mobile and base SMs, clearly understood benefits can be realized in reduced power consumption and reduced processing time.

The present invention also includes various alternate embodiments. In one alternate embodiment, the vocoder has a process delay greater than the sampled time in a frame of data, thus the vocoder speech encodes multiple frames of data simultaneously. Because of this time overlap, the vocoder is able to determine a data rate of a subsequent frame of data before speech encoding is complete on the current frame of data. This subsequent rate indication is output to the transmitting SM before the current frame of data is output to the transmitting SM. Other alternate embodiments include utilizing faster vocoders which provide more information per frame, thus generating alternate frame structures. In another alternate embodiment of the present invention, error rate evaluations are omitted or employed only occasionally under the assumption that transmission errors are very rare. Other alternate embodiments include inserting subsequent frame rate indications in other locations within the data frame (such as in an encoder tail) or inserting incremental subsequent frame rate indications which indicate changes in rates (i.e., upward, downward, no change, maximum, minimum, etc.) rather than providing one-to-one indications of the rates. Other alternate embodiments also include inserting subsequent frame rate indications only in selective frames, such as inserting indications only when a change in rates is about to occur or only for certain types of data frames, such as when assumptions can be made about other types of frames or when it is better to simply allow the other types of frames to be processed conventionally.

Furthermore, alternate methods are also contemplated for other variable data rate communication systems in addition to the CDMA digital cellular systems, including personal communication systems (PCS) and other data communication systems. Furthermore, other alternate embodiments include receiving and buffering variable rate data frames from other sources besides the vocoder, such as external variable data rate devices.

It is therefore an object of the present invention to provide a subsequent frame variable data rate indication method.

Another object of the present invention is to provide a method for indicating a data rate of a subsequent frame of data in a synchronous, fixed frame boundary system including frames of data at variable data rates.

Another object of the present invention is to provide an apparatus and a method for inserting a subsequent frame data rate indication into a current frame of data and subsequently error protecting the frame of data.

Another object of the present invention is to provide an apparatus and a method for indicating and determining subsequent frame data rates in a CDMA digital cellular system.

Yet another object of the present invention is to provide an apparatus and a method for generating a current frame of data, including determining a desired data rate of a subsequent frame of data and inserting an indication of the subsequent frame data rate into the current frame of data.

Still another object of the present invention is to provide an apparatus and a method for receiving a current frame of data and analyzing the current frame of data to determine a data rate of a subsequent frame of data.

Other objects, features and advantages of the present invention will become apparent upon reading and understanding the present specification, when taken in conjunction with the accompanying drawings.

BRIEF DESCRIPTION OF THE DRAWINGS

FIG. 5 is a flow chart representation of selected frame generation steps taken by a vocoder in accordance with a preferred embodiment of the present invention.

FIG. 6 is a flow chart representation of selected frame generation steps taken by a SM in accordance with a preferred embodiment of the present invention.

FIG. 7 is a flow chart representation of selected frame analysis steps taken by a vocoder and a SM in accordance with a preferred embodiment of the present invention.

FIG. 8 is a flow chart representation of selected frame generation steps taken by a vocoder in accordance with an alternate embodiment of the present invention.

DETAILED DESCRIPTION OF THE PREFERRED EMBODIMENTS.

Figure 1:
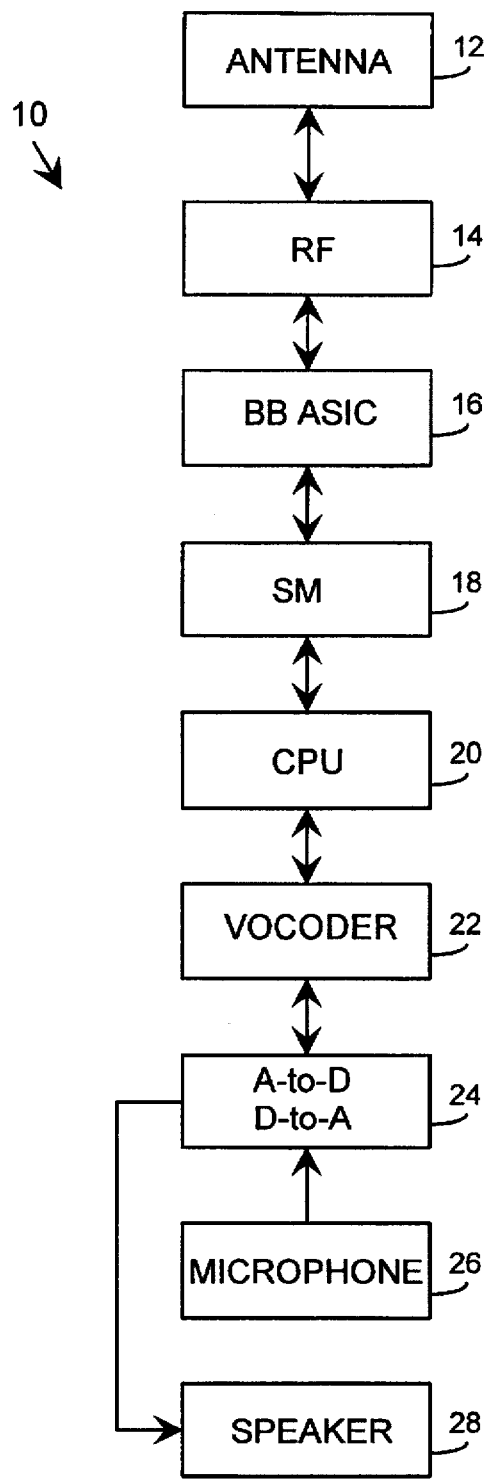
FIG. 1 is a block diagram representation of circuital elements or a speech path in a CDMA digital cellular telephone in accordance with a preferred embodiment of the present invention.
Figure 2:
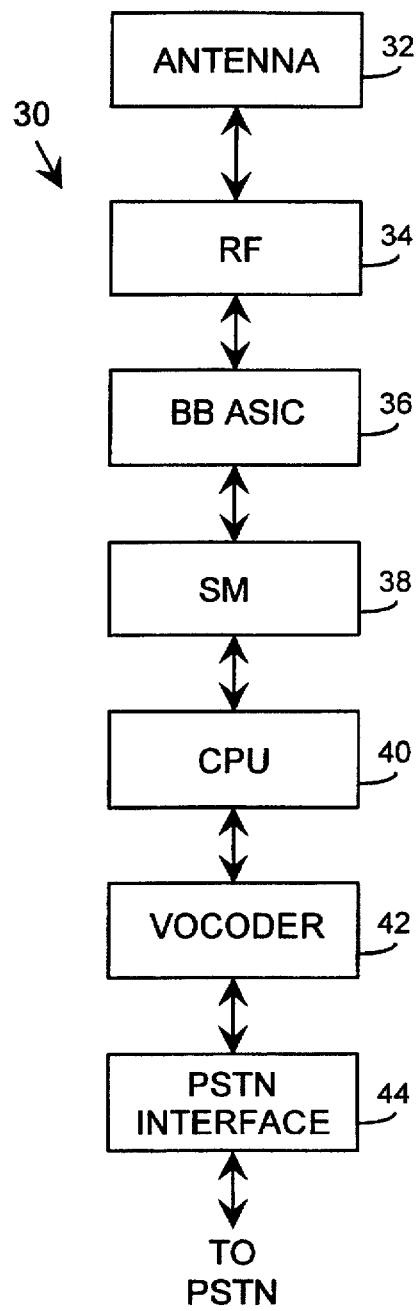
FIG. 2 is a block diagram representation of circuital elements of a speech path in a CDMA base station in accordance with the preferred embodiment of the present invention.

Referring now in greater detail to the drawings, FIGS. 1 and 2 are very similar to each other since a CDMA mobile station 10, circuital portions of which are represented in FIG. 1, and a CDMA base station 30, circuital portions of which are represented in FIG. 2, both transmit and receive CDMA signals, including traffic channel frames of data. The term "mobile station" is understood to refer to any type of cellular telephone, including units installed in vehicles and hand-held units, including conventional cellular hand-held devices and PCS personal stations. Both the CDMA mobile station 10 and the CDMA base station 30 include, respectively, an antenna 12, 32, a radio frequency (RF)

section 14, 34, a CDMA baseband application specific integrated circuit (BB ASIC) 16, 36, a station modem (SM) 18, 38, a central processing unit (CPU) 20, 40, and a vocoder (voice or speech encoder/decoder) 22, 42. The CDMA mobile station 10 further includes, connected to the vocoder 22 an analog-to-digital/digital-to-analog (A-to-D/D-to-A) converter 24 connected to a microphone 26 and a speaker 28 for interaction with a mobile station user. The CDMA base station 30 further includes a public switched telephone network (PSTN) interface 44 for interaction with the PSTN, as well as other conventional interfaces. According to the preferred embodiment of the present invention, except for the SMs 18, 38, CPUs 20, 40, and vocoders 22, 42 of FIGS. 1 and 2, the remaining elements of the CDMA mobile station 10 and the CDMA base station 30 are conventional elements and circuital combinations functioning as would be understood by those reasonably skilled in the art. Furthermore, the new elements (the SMs 18, 38, CPUs 20, 40, and vocoders 22, 42) also maintain a large degree of similarity to conventional elements, differing only to accommodate the teachings in this specification, as would be understood by one reasonably skilled in the art after review of this specification.

Transmissions from the CDMA base station 30 to the CDMA mobile station 10 are often referred to as the forward channel link, whereas transmissions from the CDMA mobile station 10 to the CDMA base station 30 are often referred to as the reverse channel link. Thus, frames of data generated by the CDMA base station 30 and transmitted in the forward channel link between the base station antenna 32 and the mobile station antenna 12 are often referred to as forward channel data frames, and frames of data generated by the CDMA mobile station 10 and transmitted in the reverse channel link between the mobile station antenna 12 and the base station antenna 32 are often referred to as reverse channel data frames. Since both the CDMA mobile station 10 and the CDMA base station 30 are transceivers capable of sending and receiving information, most of the elements of the CDMA mobile station 10 and the CDMA base station 30 are capable of performing transmitter and receiver functions, e.g., both the mobile SM 18 and the base SM 38 are each capable of performing transmitting and receiving functions.

Regarding the general functions of each of the various elements shown in FIGS. 1 and 2, the typical process of speech communication in the forward channel link begins with the PSTN interface 44 receiving pulse code modulated (PCM) speech data from the PSTN. For typical voice telephone calls, PCM speech data is digital data representing digital samples of a user's voice. After this data is passed through the PSTN interface 44, the data arrives at the base station vocoder at 64 kbps (8 kHz samples of μ-law 8 bits per sample). Conversely, in the reverse channel link, speech is received into the microphone 26 and supplied in analog form to the A-to-D/D-to-A converter 24 which converts the speech into a digital signal which is similar to that supplied to the base station vocoder 42. Thus, in the preferred embodiment of the present invention, the input for both the base station vocoder 42 and the mobile station vocoder 22 are streams of PCM speech data.

Subsequently, the transmitting functions for both the CDMA mobile station 10 and the CDMA base station 30 are relatively similar. On a high level, the vocoders 22, 42, CPUs 20, 40, and SMs 18, 38 cooperate to assemble channel frames of data, as discussed in more detail below. Subsequent to the SMs 18, 38, the channel frames of data are processed in a conventional manner by the BB ASICs 16, 36 and RF sections 14, 34 to be converted to analog signals, modulated and transmitted through the antennas 12, 32. When receiving channel frames of data, the CDMA base station 30 and the CDMA mobile station 10 reverse the above-stated functions to finally produce PCM speech data output from the vocoders 22, 42. Thus, also in a conventional manner, in the CDMA mobile station 10, the A-to-D/D-to-A converter 24 converts the PCM speech data into an analog signal which is output to the user through the speaker 28, and, likewise, the PSTN interface 44 converts the PCM speech data into a format for transmission through the PSTN.

Figure 3:
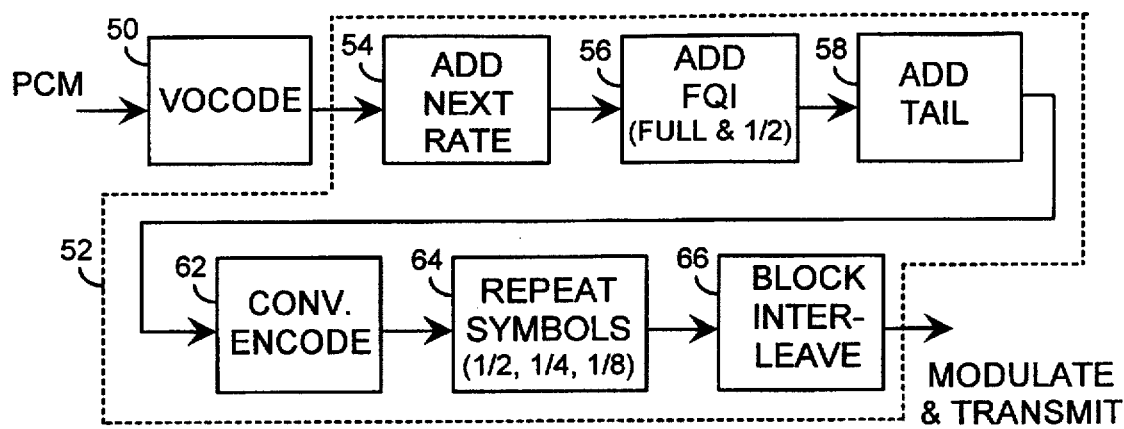
FIG. 3 is a block diagram representation of selected frame generation functions provided by a vocoder, a CPU, and art SM in accordance with a preferred embodiment of the present invention.

Now, regarding a more specific description of the new functions of the vocoders 22, 42, CPUs 20, 40, and SMs 18, 38, since the relevant process steps are similar in both the forward and reverse links, the process will be described from the viewpoint of the CDMA mobile station 10, but it should be understood that the process is also applicable to the CDMA base station 30. Refer now also to FIG. 3 which shows a block diagram representation of selected frame generation functions. A vocode function 50 is shown preceding a group of selected station modem functions 52. The vocoder 22 and the SM 18 are responsible for performing the functions shown, thus the CPU 20 mainly acts as an interface between the vocoder 22 and SM 18, according to the preferred embodiment of the present invention. Thus, except for acting to simply transfer additional information necessary for cooperation between the vocoder 22 and the SM 18, (e.g., subsequent rate indication information) the CPU 20 of the preferred embodiment of the present invention is relatively unchanged from its conventional implementation.

Figure 4:
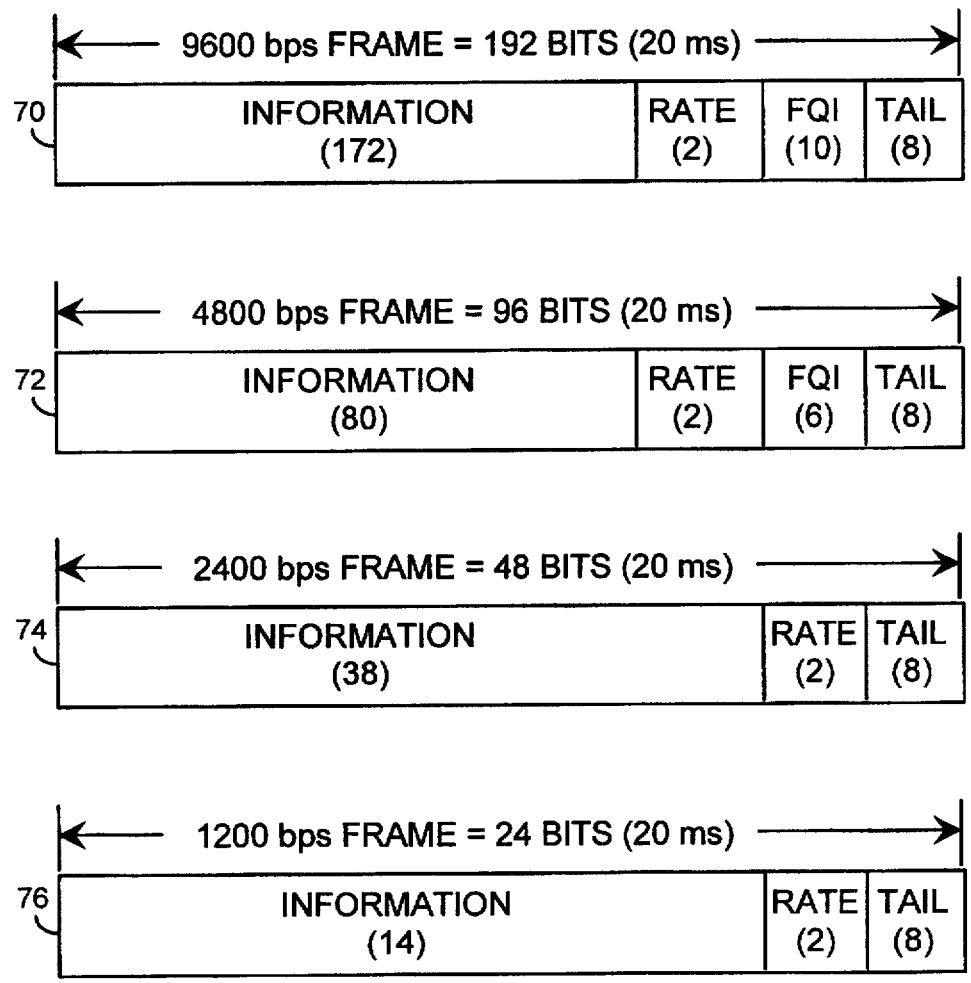
FIG. 4 shows frame structure diagrams for the CDMA traffic channel frames at various rates before being convolutionally encoded in accordance with a preferred embodiment of the present invention.

As represented in FIG. 3, the PCM speech data is first vocoded (speech encoded) as indicated by the vocode function 50. The selected SM functions 52 include an add next rate function 54, an add frame quality indicator (FQI) for full and half rates function 56 (i.e., CRC for error detection), an add encoder tail function 58, a convolutionally encode function 62 for forward error correction, a repeat symbols for half, quarter, and eighth rates function 64, and a block interleave function 66 for combating burst errors. Refer briefly to FIG. 4 which shows frame structure diagrams for CDMA traffic channel frames at various rates as the frames exist immediately before the convolutionally encode function 62. The frame structures include a full rate frame structure 70, a half rate frame structure 72, a quarter rate frame structure 74, and an eighth rate frame structure 76. As would be understood by one reasonably skilled in the art, other conventional SM functions are also performed by the SM 18 (FIG. 1) and/or the SM 38 (FIG. 2), including 64-ary orthogonal modulating, data burst randomizing, long code generating, quadrature phase shift key modulating, filtering, etc.

Referring back to FIG. 3, the vocode function 50 includes converting frames of PCM speech data into frames of speech encoded data at variable data rates to be included as information in subsequently formed traffic channel frames of data. Thus, the term "frame of data" can refer to a frame of PCM data, a frame of speech encoded data and/or a channel frame of data (traffic channel) which includes as information a frame of speech encoded data. In a conventional manner, the vocode function 50 includes comparing voice energy levels to adaptive thresholds based on detected background noise levels to determine an appropriate data rate for each frame of speech encoded data, and, using a code excited linear prediction (CELP) method, removing intrinsic redundancies to reduce the number of bits required to represent the speech. Thus, the conventional vocode (speech encoding)

function includes receiving PCM speech data and outputting frames of speech encoded data at variable data rates. However, in a quite unconventional manner, the vocode function 50 of the present invention also includes determining a data rate of a subsequent frame of speech encoded data and outputting an indication of that rate for being included in the current channel frame of data, as shown by the add next rate function 54. Thus, according to the preferred embodiment of the present invention, the vocoder outputs frames of speech encoded data at, for example, 8600 bps, 4000 bps, 1900 bps, and 700 bps. After next frame data rate indicator bits, FQI bits, and encoder tail bits are added, the frames represent 9600 bps, 4800 bps, 2400 bps, and 1200 bps as shown in FIG. 4.

Refer now to FIG. 5 which, in accordance with the preferred embodiment of the present invention, shows a flow chart representation of steps of the vocode (speech encode) function 50 of FIG. 3 as performed by the mobile station vocoder 22 (FIG. 1) in the reverse channel link (again understanding that similar steps are taken by the base station vocoder 42 (FIG. 2) in the forward channel link). A first step 100 includes receiving a first frame of PCM speech data for processing into a first frame of speech encoded data (also referred to as a speech encoded frame of data). Subsequently, in step 102, the vocoding (speech encoding) process begins for the first frame, including an initial step of determining a data rate for the first frame of data through the above-discussed adaptive threshold method. Step 104 shows that an indication of the first data rate is then output from the vocoder (transmitted to the SM 18 through the CPU 20). Speech encoding continues in step 106 until complete, after which the current speech encoded data frame is output in step 108 (during the initial pass through the vocode function 50, the "current" frame is equivalent to the "first" frame and the "next" frame is the "second" frame). The next frame of PCM data is received in step 110, and the data rate of the next frame is quickly determined in step 112. Thus, unlike other earlier speech encoding methods that determine data rates late in the speech encoding process, the present method is one in which an indication of this newly determined data rate of the next frame is generated early and then output from the vocoder 22 in step 114. Also, any extra delay in generating the traffic channel data frame will most likely be offset by the reduction in time required to determine the data rate on the receiving end of the transmission. Subsequently, as indicated at step 116, the process loops back to step 106 where yet another frame of PCM speech data is received and the process continues. Additionally, as discussed in IS-96, since the CPU 20 is able to direct the vocoder 22 to use or not use particular data rates (e.g., for signaling frames, etc.) the steps of determining and outputting data rates are readily replaced by direct communication between the SM 18 and the CPU 20 during such special rate situations.

The next frame indication consists of two bits in the preferred embodiment of the present invention since two bits are adequate to provide a one-to-one representation of the four possible data rates. With any number of possible rates, the number of bits necessary to provide a one-to-one representation of the various rates equals the smallest integer greater or equal to the $Log_2$ of the total number of possible rates. Refer now also to FIG. 6 which shows a flow chart representation of selected frame generation steps taken by the SM 18 (and SM 38). According to the preferred embodiment, the first frame data rate indication (for the first pass, "current" is equivalent to "first", and "subsequent" is equivalent to "second") is stored in the SM 18 (step 118) until the current frame of speech encoded data (step 12) and the next frame data rate indication (step 122) arrive from the vocoder 22, as explained above. Thus, when the SM 18 has both the subsequent frame data rate indication and the current frame of speech encoded data, both are combined into the beginnings of a current traffic channel frame of data (step 124), as indicated by the add next rate function 54 (FIG. 3). Another way of expressing this combining function is that the subsequent frame data rate indication is embedded or inserted into the current channel frame of data which contains the current frame of speech encoded data as the information portion of the current channel frame of data.

Subsequently, for the full and half rates, a frame quality indicator is computed and added to the current channel frame of data, as also indicated by the add FQI function 56 of FIG. 3. Then, encoder tail bits are added to the current channel frame of data, as shown by step 128 of FIG. 6 and the add encoder tail function of 58. Thus, as shown in FIG. 4, the pre-encoder frame structures of the preferred embodiment differ from conventional channel frame structures in that the subsequent frame data rate indication is substituted for two FQI bits for the full and half rate structures 70, 72, and for two information bits in the quarter and eighth rate structures 74, 76 (i.e., the conventional frame structures include 12 FQI bits for full rate, 8 FQI bits for half rate, 40 information bits for quarter rate, and 16 information bits for eighth rate). As discussed below, this particular placement of the subsequent frame data rate indications, as well as the particular format of the rate indications, are given only as acceptable examples of the teaching of the present invention. Additionally, since, in the preferred embodiment, the add FQI function 56 (step 126) includes computing the FQI based upon the information and subsequent frame data rate indication, additional error detection capabilities are realized.

After the current channel frame of data is assembled in one of the rate formats shown in FIG. 4, the current channel frame of data is convolutionally encoded at the data rate for the current frame of data, as indicated by step 130 of FIG. 6 and the convolutionally encode function 62 of FIG. 3. In this way, the subsequent frame data rate indication is also encoded along with the information bits to provide good error correction for the subsequent frame data rate indication without additional overhead or complexity. Subsequent to convolutional encoding, encoder symbols (representative of pre-encoder bits) are repeated throughout the frame for rates lower than full rate (step 132 of FIG. 6, function 64 of FIG. 3), and block interleaving is used to further protect the integrity of the current channel frame, including the indication of the next frame data rate (step 134, function 66). Both of these functions, as well as the remaining steps necessary for completing the processing (step 136), including modulation, etc., are conventional steps as would be understood by those reasonably skilled in the art. Finally, this process loops back through step 138 to step 120 as shown in FIG. 6 for processing the next channel frame of data.

On the receiving end of a transmission of a channel frame of data, such as the forward traffic channel link, (understanding that similar events occur in the reverse link) the CDMA mobile station 10 is able to easily determine the data rate of the information contained in the next channel frame of data. Refer now to FIG. 7 which shows a flow chart representation of selected frame analysis steps taken by the vocoder 22 and the SM 18 in accordance with the preferred embodiment of the present invention. A first step includes receiving a first channel frame of data (convolutionally encoded data) at one of the four potential data rates (step 152). Subsequently, the SM 18 processes the first channel frame of data at all of the four possible data rates to determine (through conventional analysis of FQI bits and symbol error rates, etc.) the correct data rate of the first frame of data. Then, in step 156, the data rate of the next channel frame of data is determined by isolating and analyzing the subsequent frame data rate indication of the current channel frame of data. Step 158 indicates that processing of the first channel frame of data is then completed, including speech decoding the information at the current data rate.

Next, equipped with an expectation of the data rate of the next channel frame of data, the SM 18 receives the next channel frame of data in step 160, at which point that "next" becomes "current". Then, the frame of data is processed at the expected data rate, including reversing functions 64 and 62 of FIG. 3. In an effort to prevent transmission errors from propagating through the series of data frames, the validity of the rate chosen for each processed frame is evaluated at decision block 164 through, as an example, a FQI analysis and a symbol error rate analysis. For example, for the full and half rates, if FQI checking passes, or if FQI checking fails and the symbol error rate is below a predetermined threshold, and for the quarter and eighth rates, if the symbol error rate is below the threshold, the rate is determined to be valid, and the operation proceeds through the YES branch to step 166. At that point, the current frame is analyzed to isolate the subsequent frame data rate indication and determine the data rate of the next channel frame of data. Subsequently, in step 168, processing of the current frame of data is continued until complete, and the process loops back to step 160 to continue processing. If the data rate was not found to be valid at decision block 164, conventional processing is utilized in step 170 to determine the appropriate data rate for the current frame and then, in step 172, determine the data rate of the next frame of data from the subsequent frame data rate indication before continuing with step 168 as shown. Also, though not shown, in FIG. 7, if the rate still cannot be determined after being processed at the various possible data rates, the frame is classified as an erasure frame, and the process continues by processing the next frame as the first frame was processed in step 152.

The present invention also includes various alternate embodiments. According to one alternate embodiment, as represented by an alternate vocode function 50' in FIG. 8, PCM data for the next frame of speech encoded data is received in step 204, before the speech encoding processing on the first frame of data is complete. This is due to the vocode function requiring more time than (has a process delay greater than) the amount of time represented by one frame of data, e.g., 20 ms. Thus, the vocoder of this alternate embodiment processes multiple frames of data simultaneously, as evidenced by step 206 where the speech encoding process also begins on the next (subsequent) frame of data. Because of this time overlap, the alternate vocoder is able to determine and output a data rate of the next frame of data before speech encoding is complete on the current frame of data, as evidence by steps 208–212. Accordingly, the process of FIG. 6 would be changed by reversing the order between steps 120 and 122 since the next frame data rate would arrive at the SM before the current frame of speech encoded data. In another alternate embodiment similar the preferred embodiment, steps 104–114 of FIG. 5 are, in a way, combined so that only one vocoder output is made per frame. After the first frame, such an output to the SM would include the current speech encoded data and the indication of the subsequent frame data rate, and the first frame output would include the first and second frame data rates along with the speech encoded data. Yet another alternate embodiment includes a combination of the last two alternate embodiments where, depending on the amount of time required by the vocoder for any particular frame, data (speech data or rate indication data) is output to the SM whenever available. Since vocoders often take more or less time depending on the rates used, the next frame data rate indication may be available and output before or after the current frame speech encoded data.

In another class of alternate embodiments of the present invention, error rate evaluation steps 164, 170, and 172 are omitted or only performed occasionally under the assumption that transmission errors are very rare. Other alternate embodiments include inserting the subsequent frame data rate indications in alternate locations within the data frame (e.g., the encoder tail bits, etc.) or inserting incremental subsequent frame data rate indications which indicate changes in rates (i.e., upward, downward, no change, maximum, minimum, etc.) rather than providing one-to-one indications of the rates. Other alternate embodiments also include inserting subsequent frame data rate indications only in selective frames, such as inserting indications only when a change in rates is about to occur or for certain types of data frames, such as when assumptions can be made about other types of frames or when it is better to simply allow the other types of frames to be processed conventionally. Similarly, a system in which only one direction of communication utilizing subsequent frame rate identifications is also contemplated. In one example of such a system, forward traffic channel frames transmitted by the base station, for example, would include subsequent frame rate identifications, yet reverse traffic channel frames transmitted by the mobile station would not include such indications. Such a system would be applicable when base station receiving resources are freely available for conventional rate determinations and/or when it is advantageous not to use mobile station transmitting resources to include such subsequent frame rate indications. Yet another alternate embodiment includes establishing a convention that the first frame of data in any transmission is generated at a particular data rate so that such an assumption may be relied upon at the receiving end. Such a convention would eliminate step 154 of FIG. 7, and change step 152 to include receiving a first frame of coded data at a predetermined data rate and change step 156 to include analyzing the only version of convolutionally decoded data to determine the data rate of the next frame of coded data.

Another alternate embodiment of the present invention includes utilizing a higher rate vocoder, such as vocoders operating on traffic channel frames at 14.4 kbps and/or above. A similar rate breakdown can be utilized, i.e., a 14.4 kbps vocoder would have a full (traffic channel) data rate of 14.4 kbps, a half rate of 7200 bps, a quarter rate of 3600 bps, and an eighth rate of 1800 bps. Higher data rates are also often accompanied by alternate frame structures with more bits (also included within the scope of the present invention) such as frame structures where all four possible rates include frame quality indicator bits for being partially substituted with subsequent frame data rate indication bits. Still other alternate embodiments include speech encoding processes which receive PCM data in other formats and at other rates, such as linear PCM as opposed to μ-law PCM, as well as outputting frames of alternate lengths, such as those encompassing 10 ms of sampled speech.

Other alternate methods are also contemplated for other variable data rate communication systems in addition to the CDMA digital cellular systems and PCS systems. Furthermore, other alternate embodiments including receiving and buffering variable rate data frames from other sources besides the vocoder, such as external data devices communicating at variable data rates. Still other embodiments include utilizing alternate error protection (error detection and error correction) methods, such as various block encoding methods as opposed to the convolutional encoding method disclosed. Finally, as would be understood by one reasonably skilled in the art, many of the elements of the present invention can easily be split into combinations of more discrete elements or combined into fewer, more complex elements. Thus, the scope of the present invention certainly includes any such increase or decrease in the number and complexity of elements necessary to perform the described functions.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means-or-step-plus-function elements in the claims below are intended to include any structure, material, or acts for performing the function as specifically claimed and as would be understood as substitutes by persons skilled in the art.

We claim:

1. An apparatus for forming a frame structure, said apparatus comprising means for inserting current frame information bits into the frame structure, and means coupled to said inserting current frame information bits means for inserting subsequent frame data rate indicator bits into the frame structure, wherein the subsequent frame data rate indicator bits indicate a data rate of a subsequent frame of data.

2. The frame forming apparatus of claim 1, further comprising means for receiving current frame signal information data;

means for transforming, at a transforming rate, the current frame signal information data into the current frame information bits;

means for determining a data rate for the current frame information bits, means for receiving subsequent frame signal information data;

means for transforming, at the transforming rate, the subsequent frame signal information data into subsequent frame information bits;

means for determining a data rate, for the subsequent frame information bits, which is indicated in the subsequent frame data rate indicator bits; and means for generating the subsequent frame data rate indicator bits which indicate the data rate of the subsequent frame information bits.

3. The apparatus of claim 1, wherein the frame structure defines a code division multiple access digital cellular telephone traffic channel frame.

4. The apparatus of claim 1, wherein the frame structure defines a synchronous fixed boundary frame of variable rate data.

5. An apparatus for forming a frame memory structure, said apparatus comprising means for inserting current frame information bits into the frame structure; and means for inserting, responsive to a data rate of a subsequent frame of data being different from a data rate of a current frame of data, subsequent frame data rate indicator bits into the frame structure, wherein the subsequent frame data rate indicator bits indicate the data rate of the subsequent frame of data.

6. The frame forming apparatus of claim 5, further comprising:

means for receiving current frame signal information data;

means for transforming, at a transforming rate, the current frame signal information data into the current frame information bits;

means for determining a data rate for the current frame information bits;

means for receiving subsequent frame signal information data;

means for transforming, at the transforming rate, the subsequent frame signal information data into subsequent frame information bits;

means for determining a data rate, for the subsequent frame information bits, which is indicated in the subsequent frame data rate indicator bits;

means for comparing the subsequent frame information bits data rate to the current frame information bits data rate;

means for detecting if the subsequent frame information bits data rate is different from the current frame information bits data rate; and means for generating, responsive to the subsequent frame information bits data rate being different from the circuit frame information bits data rate, the subsequent frame data rate indicator bits.

7. The frame forming apparatus of claim 5, wherein the frame structure defines a code division multiple access digital cellular telephone traffic channel frame.

8. The frame forming apparatus of claim 5, wherein the frame structure defines a synchronous fixed boundary frame of variable rate data.

9. A communication system for transmitting and receiving fixed boundary data frames including data at variable rates; said system comprising:

a first transceiver including means for generating a current frame of data at a current frame data rate, means for generating a next frame of data, at a next frame data rate, subsequent to the current frame of data, means for inserting in the current frame of data a next frame data rate indicator which indicates the next frame data rate of the next frame of data, and means for transmitting the current frame of data; and a second transceiver including means for receiving the current frame of data, and means for analyzing the current frame of data to detect the next frame data rate indicator.

10. The communication system of claim 9, wherein the inserting means includes means, responsive to the next frame data rate being different from the current frame data rate, for inserting the next frame data rate indicator into the current frame of data.

11. The communication system of claim 9, wherein said first transceiver further includes means for transmitting the next frame of data at the next frame data rate, wherein the next frame of data transmitting means includes means for transmitting a synchronous, fixed boundary next frame of variable rate data.

12. The communication system of claim 9, wherein said first transceiver further includes means for transmitting the next frame of data at the next frame data rate and means for determining the next frame data rate.

13. The communication system of claim 9, wherein the next frame of data generating means includes means for receiving pulse code modulated speech data from a public switch telephone network, and means for speech encoding the pulse code modulated speech data into speech encoded data included in the next frame of data.

14. The communication system of claim 9, wherein the current frame data rate is a predetermined current frame data rate.

15. The communication system of claim 9, wherein the current frame data rate is unknown.

16. A receiver for receiving fixed boundary data frames including data at variable rates, said apparatus comprising:

means for receiving a current frame of data at a current frame data rate, wherein the current frame of data includes a next frame data rate indicator which indicates the next frame data rate; means for analyzing the current frame of data to detect the next frame data rate indicator; and means for determining the next frame data rate from the next frame data rate indicator.

17. The receiver of claim 16, wherein the current frame data rate is a predetermined current frame data rate.

18. The receiver of claim 16, wherein the current frame data rate is unknown.

19. The receiver of claim 16, further comprising means for receiving the next frame of data at the next frame data rate, determined by said determining means; and means for processing the next frame of data at the next frame data rate, wherein said next frame receiving means includes means for receiving a synchronous, fixed boundary next frame of variable rate data.

20. The receiver of claim 16, wherein the current frame of data defines a frame memory structure comprising current frame information bits including current frame signal information data, next frame data rate indicator bits including the next frame data rate indicator, responsive to the current frame data rate exceeding a speed threshold, frame quality indicator bits based upon the current frame information bits and the next frame data rate indicator bits, and tail bits which indicate the end of the frame memory structure, wherein the current frame information bits include speech encoded pulse code modulated data.

21. The receiver of claim 16, wherein said receiver includes a code division multiple access (CDMA) digital cellular telephone receiver.

22. The receiver of claim 16, wherein said receiver includes a personal communication system receiver.

23. A receiver for receiving fixed boundary data frames including data at variable rates, comprising:

means for receiving a current frame of data at a current frame data rate, wherein the current frame of data includes, responsive to a next frame data rate being different from the current frame data rate, a next frame data rate indicator which indicates the next frame data rate;

means for analyzing the current frame of data to detect the next frame data rate indicator; and means for determining the next frame data rate.

24. The receiver of claim 23, wherein the current frame data rate is a predetermined current frame data rate.

25. The receiver of claim 23, wherein the current frame data rate is unknown.

26. The receiver of claim 23, further comprising means for receiving the next frame of data at the next frame data rate determined by said determining means; and means for processing the next frame of data at the next frame data rate determined by said determining means, wherein said next frame of data receiving means includes means for receiving a synchronous, fixed boundary next frame of variable rate data.

27. The receiver of claim 23, wherein the current frame of data defines a frame structure comprising current frame information bits including current frame signal information data, responsive to the next frame data rate being different from the current frame data rate, next frame data rate indicator bits including the next frame data rate indicator, responsive to the current frame data rate exceeding a speed threshold, frame quality indicator bits based upon both the current frame information bits and, responsive to the next frame data rate being different from the current frame data rate, the next frame data rate indicator bits, and tail bits which indicate the end of the frame structure, wherein the current frame information bits include speech encoded pulse code modulated data.

28. The receiver of claim 23, wherein the current frame of data defines a frame structure comprising current frame information bits including current frame signal information data, responsive to the next frame data rate being different from the current frame data rate, next frame data rate indicator bits including the next frame data rate indicator, responsive to the current frame data rate exceeding a speed threshold, frame quality indicator bits based upon both the current frame information bits and, responsive to the next frame data rate being different from the current frame data rate, the next frame data rate indicator bits, tail bits which indicate the end of the frame structure, and means for determining a received data quality, for the current frame of data, which reflects the data integrity.

29. The receiver of claim 23, wherein said receiver includes a code division multiple access (CDMA) digital cellular telephone receiver.

30. The receiver of claim 23, wherein said receiver includes a personal communication system receiver.

31. A transmitter for transmitting fixed boundary data frames including data at variable rates, said transmitter comprising:

means for generating a current frame of data at a current frame data rate;

means for generating a next frame of data, at a next frame data rate, subsequent to the current frame of data; and means for transmitting the current frame of data, wherein the current frame of data includes a next frame data rate indicator which indicates the next frame data rate.

32. The transmitter of claim 31, further comprising means for transmitting the next frame of data at the next frame data rate, wherein said next frame transmitting means includes means for transmitting a synchronous, fixed boundary next frame of variable rate data.

33. The transmitter of claim 31, further comprising means for transmitting the next frame of data at the next frame data rate; and means for ensuring that the next frame of data is actually transmitted at the next frame data rate.

34. The transmitter of claim 31, wherein said next frame generating means includes means for receiving signal information data for the next frame of data, and means for transforming, at a transforming rate, signal information data into signal information data bits for the next frame of data at the next frame data rate, wherein said transforming means includes means for determining, responsive to a comparison of signal information data bits energy levels to adaptive thresholds based on detected background noise levels, the next frame data rate.

35. The transmitter of claim 31, wherein said next frame generating means includes means for receiving signal information data for the next frame of data, and means for transforming, at a transforming rate, signal information data into signal information data bits for the next frame of data at the next frame data rate, and wherein said receiving means includes means for receiving pulse code modulated speech data, and said transforming means includes means for speech encoding the pulse code modulated data.

36. The transmitter of claim 31, wherein the current frame data rate is a predetermined current frame data rate.

37. The transmitter of claim 31, wherein said current frame transmitting means includes means for interleaving the current, frame of data to protect data integrity, and means for modulating for transmission the current frame of data.

38. The transmitter of claim 31, wherein said apparatus includes a code division multiple access (CDMA) digital cellular telephone transmitter apparatus.

39. The transmitter of claim 31, wherein said apparatus includes a personal communication system transmitter.

40. A transmitter for transmitting fixed boundary data frames including data at variable rates, said apparatus comprising:

means for generating a current frame of data at a current frame data rate;

means for generating a next frame of data, at a next frame data rate, subsequent to the current frame of data;

means for determining whether the next frame data rate differs from the current frame data rate;

means for inserting, responsive to the next frame data rate being different from the current frame data rate, a data rate indicator, which indicates the data rate of the next frame of data, into the current frame of data; and means for transmitting the current frame of data at the current frame data rate.

41. The transmitter of claim 40, further comprising means for transmitting the next frame of data at the next frame data rate, wherein said next frame transmitting means includes means for transmitting a synchronous, fixed boundary next frame of variable rate data.

42. The transmitter of claim 40, further comprising:

means for transmitting the next frame of data at the next frame data rate; and means for ensuring that the next frame of data is actually transmitted at the next frame data rate.

43. The transmitter of claim 40, wherein the current frame data rate and the next frame data rate are the same rate, and the current frame of data contains no next frame data rate indicator.

44. The transmitter of claim 40, wherein said next frame generating means includes means for receiving signal information data for the next frame of data, and means for transforming, at a transforming rate, signal information data into signal information data bits for the next frame of data at the next frame data rate, wherein said transforming means includes means for determining, responsive to a comparison of signal information data bits energy levels to adaptive thresholds based on detected background noise levels, the next frame data rate.

45. The transmitter of claim 40, wherein said next frame generating means includes means for receiving signal information data for the next frame of data, wherein said receiving means includes means for receiving pulse code modulated speech data, and means for transforming, at a transforming rate, signal information data into signal information data bits for the next frame of data at the next frame data rate, wherein said transforming means includes means for speech encoding the pulse code modulated data.

46. The transmitter apparatus of claim 40, wherein the current frame data rate is a predetermined current frame data rate.

47. The transmitter of claim 40, wherein said next frame generating means includes memos for receiving signal information data for the next frame of data, and means for transforming, at a transforming rate, signal information data into signal information data bits for the next frame of data at the next frame data rate, wherein the current frame of data defines a frame structure comprising current frame signal information data bits including current frame signal information data, responsive to the next frame data rate being different from the current frame data rate, next frame data rate indicator bits including the next frame data rate indicator, responsive to the current frame data rate exceeding a speed threshold, frame quality indicator bits based upon both the current frame information bits and, responsive to the next frame data rate being different from the current frame data rate, the next frame data rate indicator bits, and tail bits which indicate the end of the frame structure, and wherein the transmitter further comprises means for convolutionally encoding, at a convolutional encoding rate, the current frame of data; and means for including encoder symbol bits in the convolutionally encoded current frame of data, wherein the encoder symbol bits are representative of bits in the current frame of data before convolutional encoding, wherein the convolutional encoding rate and the transforming rate are the same rate.

48. The transmitter of claim 40, wherein said current frame transmitting means includes means for interleaving the current frame of data to protect data integrity, and means for modulating for transmission the current frame of data.

49. The transmitter of claim 40, wherein the transmitter includes a code division multiple access (CDMA) digital cellular telephone transmitter.

50. The transmitter of claim 40, wherein the transmitter includes a personal communication system transmitter.

51. A transmitter for transmitting fixed boundary data frames of variable rate data, said apparatus comprising:

means for generating, at a current frame data rate, a current frame of data, wherein
said current frame of data generating means includes
means for receiving first pulse code modulated speech data for the current frame of data,
means for initiating a speech encoding process to generate current frame speech encoded data at the current frame data rate by analyzing the first pulse code modulated speech data to determine the current frame data rate, and
means for completing the speech encoding process by producing current frame speech encoded data included in the current frame of data; and
means for generating, at a next frame data rate, a next frame of data subsequent to the current frame of data, wherein said next frame of data generating means includes
means for receiving second pulse code modulated speech data for the next frame of data,
means for initiating a speech encoding process to generate next frame speech encoded data at the next frame data rate by analyzing the second pulse code modulated speech data to determine the next frame data rate, and
means for completing the speech encoding process by producing next frame speech encoded data included in the next frame of data,
wherein said current frame of data generating means further includes means for including in the current frame of data a next frame data rate indicator which indicates the next frame data rate.

52. The transmitter of claim 51, wherein the first pulse code modulated speech data receiving means in said current frame of data generating means includes means for receiving pulse code modulated speech data from a public switch telephone network (PSTN).

53. The transmitter of claim 51, wherein said transmitter includes a personal communication system transmitter.

54. The transmitter of claim 51, wherein said transmitter includes a code division multiple access digital cellular telephone system transmitter.

55. An apparatus for receiving and analyzing a frame structure, said apparatus comprising:

means for receiving a current frame of data at a current frame data rate; and
means for analyzing the current frame of data to detect a frame structure, wherein the frame structure includes
signal information data bits which include current frame signal information,
next frame data rate indicator bits which include a next frame data rate indicator which indicates a data rate of a next frame of data,
responsive to the current frame data rate exceeding a speed threshold, frame quality indicator bits which are based upon the signal information data bits and the next frame data rate indicator bits, and
tail bits which indicate the end of the current frame of data.

56. The apparatus of claim 55, wherein the frame structure is a predetermined frame structure.

57. The apparatus of claim 55, further comprising means for receiving the next frame of data at the next frame data rate, wherein the next frame of data has the same frame structure as the current frame of data.

* * * * *